United States Patent [19]
Minhinnick et al.

[11] 3,995,082
[45] Nov. 30, 1976

[54] WEATHERSTRIP WITH MOUNTING INSERT
[75] Inventors: James W. Minhinnick, Grand Rapids; Carl H. Wollen, Kent, both of Mich.
[73] Assignee: U.S. Industries, Inc., New York, N.Y.
[22] Filed: Mar. 12, 1976
[21] Appl. No.: 666,190

[52] U.S. Cl. .............................. 428/159; 264/46.4; 428/189; 428/192; 428/315; 428/474
[51] Int. Cl.² ........................................... B32B 3/26
[58] Field of Search ............... 264/46.4; 428/31, 67, 428/80, 81, 189, 192, 315, 474, 157, 158, 159

[56] References Cited
FOREIGN PATENTS OR APPLICATIONS
1,239,561  7/1971  United Kingdom................. 428/315
1,061,971  3/1967  United Kingdom................. 264/46.4

Primary Examiner—William J. Van Balen
Attorney, Agent, or Firm—Price, Heneveld, Huizenga & Cooper

[57] ABSTRACT

The specification discloses a weatherstrip for automobile doors, windows and the like comprising a strip of closed cell neoprene material, having an end which is molded over a mounting plate such that the mounting plate is an integral part of the end of the neoprene strip. The mounting plate is molded to a desired mounting configuration of a heat stabilized, mineral filled polyamide polymer containing approximately forty percent by weight of a finely divided mineral powder.

10 Claims, 2 Drawing Figures

WEATHERSTRIP WITH MOUNTING INSERT

BACKGROUND OF THE INVENTION

The present invention relates to weatherstrips for automobile and truck doors, windows and the like. In particular, it relates to weatherstrips made of closed cell neoprene rubber which is molded into the shape of the strip. Closed cell neoprene is considered to be the most desirable weatherstrip material since it has good flexibility and good resistance to aging in use.

The strip of closed cell neoprene material is usually molded with a flanged area at the ends which includes a metal insert molded in place. The metal insert is bent into the desired shape to facilitate mounting the end of the weatherstrip on the car door or the like.

For some time, efforts have been made to substitute plastic molded inserts for the metal inserts. This would save substantial fabrication costs which are involved in bending the metal plate. Numerous plastics have been suggested as metal substitutes, particularly reinforced resins and thermoset resins. Polyethylene oxide, phenolics and glass reinforced polyesters have been tried. However, due to the parameters involved in manufacturing and use of closed cell neoprene weatherstrips, these plastic substitutes have not been successful.

Turning first to the molding parameters involved, the closed cell neoprene rubber is molded at 350° F. for fairly long periods of time, up to a maximum of about thirty minutes. The pressures involved are anywhere between ten to one hundred psi. During this molding, a plastic mounting insert tends to warp, making it impossible to mount the strip on the car. If it does not actually warp, it tends to take a set when it is handled while still hot. Also, the heat corrodes the plastic insert and may even cause it to deposit out on the mold surface.

Even when a plastic passes the muster in molding, it may fail in use, particularly since the parameters of use tend to require a different type of plastic than the parameters of molding. Plastics which tend to resist heat fairly well are too brittle at normal use temperatures. If the plastic is too brittle, it may crack or break when the workman is bolting it in place on the car door or body. It may break when the door is shut. The possibility of a brittle part cutting through the neoprene overcoat is also a risk. Thus, the mounting insert must have a certain degree of flexibility and flexibility tends to be inconsistent with high heat resistance.

Another use parameter is that the mounting insert must be sufficiently resistant to heat that warping is avoided in shipping or storing the parts. The temperature in box cars or truck trailers may get as high as 250° F., particularly in the West and Southwest.

The various parameters have heretofore not been satisfied, even with plastics which have been specifically suggested as metal substitutes. Numerous failures in attempting to substitute plastics advertised as metal substitutes have plagued such substitution efforts, at least in the case of mounting inserts for weatherstrips made of closed cell neoprene.

SUMMARY OF THE INVENTION

The present invention comprises a closed cell neoprene weatherstrip having one end molded over a mounting insert, itself molded to a desired mounting shape of a heat stabilized, mineral filled polyamide polymer containing approximately thirty to approximately fifty percent by weight of a finely divided mineral powder. Such a mounting insert can resist the problems of warping during molding of the weatherstrip and yet is sufficiently flexible in use that the problems associated with brittleness are avoided.

DESCRIPTION OF THE PREFERRED EMBODIMENT

Figure 1:
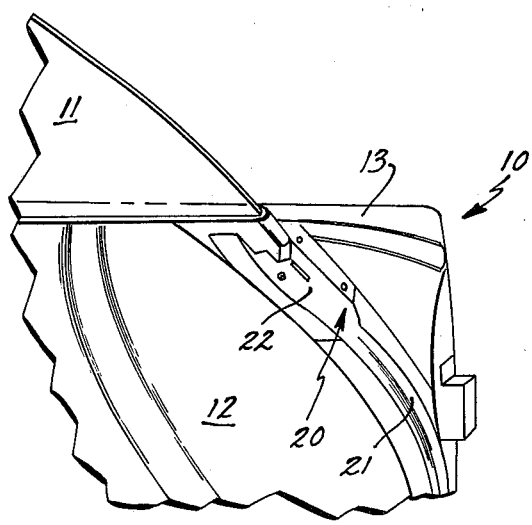
FIG. 1 is a perspective view of a fragmented portion of a car door, looking at the door from the inside of the car as the door is opened.

The weatherstrip 20 shown in FIG. 1 is mounted on the inside edge of a car door 10. The door window 11, a portion of the inner door panel 12 and a corner of the outer door panel 13 can be seen in FIG. 1. Weatherstrip 20 is molded of a closed cell neoprene and comprises a bead 21 and an enlarged flange 22 at one end.

Figure 2:
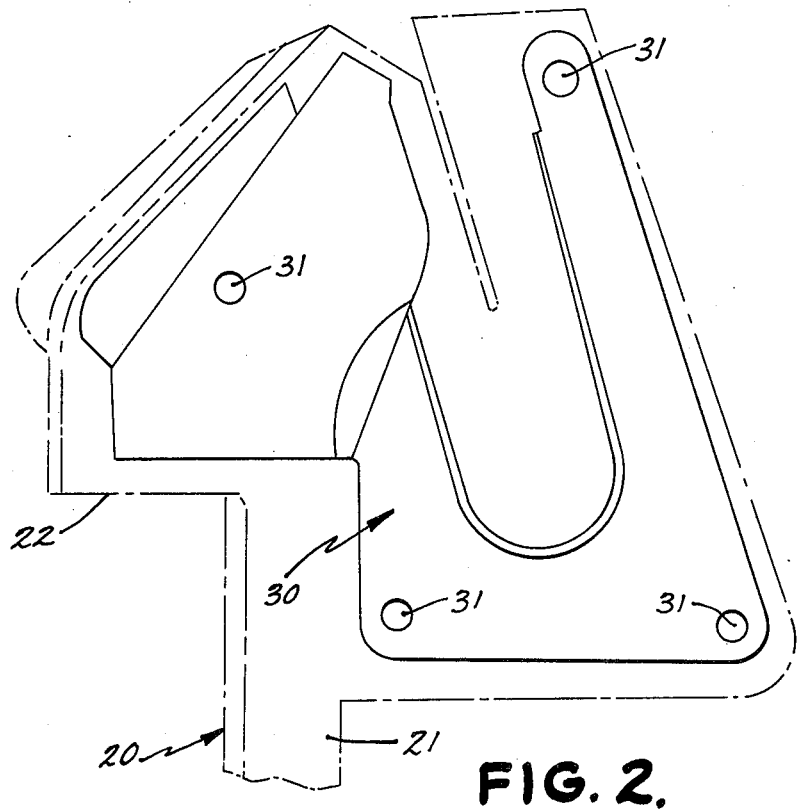
FIG. 2 is a plan view of the mounting insert used in the weatherstrip shown in FIG. 1, with the shape of the weatherstrip relative to the shape of the mounting insert being shown in phantom.

The enlarged flange 22 is molded over a mounting insert or mounting plate 30 (FIG. 2) which has been molded to the shape necessary to fit onto the inside edge of car door 10. It is desirable that mounting inserts such as mounting insert 30 be made of a material which can be given any of a variety of different types of shapes so as to fit properly on the automobile. One such unusual shape required is shown in plan view in FIG. 2. Basically, mounting insert 30 comprises a plate having a plurality of holes 31 therein through which bolts can be passed to bolt the mounting plate 30 and its weatherstrip 20 to the automobile.

Mounting insert 30 is molded of a heat stabilized, mineral reinforced polyamide polymer. The preferred polyamide resin has a molecular weight of about 20,000 and is of the 6/6 variety. Its basic chemical structure is as follows:

$$H[HN(CH_2)_6NH\ CO(CH_2)_4CO]N\ OH$$

The resin is filled with between about thirty and about fifty percent by weight of a finely divided mineral powder. The particular mineral filler used may vary. Desirable mineral fillers include asbestos, talc, sand, diatomaceous earth, novaculite, quartz, tripoli, kaolin clay, mica, nepheline syenite and wollastonite, a calcium metasilicate.

The polyamide resin is also heat stabilized in a conventional manner. Heat stabilization technology and types of heat stabilizers, such as metal soaps, organotins, leads, nitrogen compounds, organophosphites, epoxies and phenols are all well-known in the art. The metal soats and leads, including lead carbonate, tribasic lead sulfate, lead silicate, dibasic lead stearate, dibasic lead phthalate, lead stearate, dibasic lead phosphite and tribasic lead maleate are particularly desirable in the practice of this invention in that they show good heat and weather resistance.

Naturally, variations in formulation can produce variations in physical properties. Preferably, the following physical properties should be sought in the dry as molded resin: a specific gravity of around 1.47; a flexural modulus of about 650,000 to 750,000; a flexural strengty (dry) of about 22,000; a tensile strength and yield stress of about 13,500; flexural creep at 257° F. 1,000 psi and 1,000 hours of no more than about 1.1%;

a deflection temperature at 66 psi of 460° F. and at 264 psi of about 410° F. and a melting point of approximately 500° F. One mineral filled polyamide which is commercially available and which has been found acceptable is VIP 19-139E, available from Vinyl Industrial Products, Inc. of Grand Rapids, Michigan.

Once the mounting insert 30 has been molded to the desired mounting configuration, it is placed in a mold and the closed cell neoprene is molded around it. This molding operation is conventional and is done in the same way that closed cell neoprene is molded around metal mounting inserts.

As a result of the present invention, the substantial costs involved in cutting, bending and otherwise fabricating metal inserts for closed cell neoprene weatherstrips is eliminated. The heat stabilized, mineral reinforced polyamide polymer mounting insert employed in the weatherstrip of the present invention can take the substantial molding temperatures involved in manufacturing the weatherstrip without significant warping and has sufficient flexibility that cracking during mounting and use of the weatherstrip are avoided.

Of course, it is understood that the above is merely a preferred embodiment of the invention and that various changes and alterations can be made without departing from the spirit and broader aspects of the invention as defined in the appended claims.

The embodiments of the invention in which an exclusive property or privilege is claimed are defined as follows:

1. A weatherstrip for automobile doors, windows and the like comprising: a strip of closed cell neoprene material; a mounting plate molded to a desired mounting configuration of a heat stabilized, mineral filled polyamide polymer, said polymer containing approximately thirty to approximately 50 percent by weight of a finely divided mineral powder; said strip of closed cell neoprene material having at least one end molded over said mounting plate such that said weatherstrip can be mounted to the automobile by fastening said mounting plate to the automobile.

2. The weatherstrip of claim 1 in which said heat stabilized mineral filled polyamide polymer has a melting point of approximately 500° F. and a flexural modulus of approximately 750,000.

3. The weatherstrip of claim 2 in which said heat stabilized mineral filled polyamide polymer is of the 6/6 type polyamide.

4. The weatherstrip of claim 3 in which said heat stabilized mineral filled polyamide polymer has a molecular weight as a resin of about 20,000.

5. The weatherstrip of claim 4 in which said heat stabilized mineral filled polyamide polymer contains approximately 40 percent by weight of finely divided mineral powder.

6. The weatherstrip of claim 5 in which said finely divided mineral powder in said heat stabilized, mineral filled polyamide is selected from the group consisting of talc, sand, mica, diatomaceous earth, novaculite, quartz, tripoli, asbestos, kaolin clay, nepheline syenite and wollastonite.

7. The weatherstrip of claim 1 in which said heat stabilized mineral filled polyamide polymer is of the 6/6 type polyamide.

8. The weatherstrip of claim 1 in which said heat stabilized mineral filled polyamide polymer contains approximately forty percent by weight of finely divided mineral powder.

9. The weatherstrip of claim 1 in which said finely divided mineral powder in said heat stabilized, mineral filled polyamide is selected from the group consisting of talc, sand, mica, diatomaceous earth, novaculite, quartz, tripoli, asbestos, kaolin clay, nepheline syenite and wollastonite.

10. The weatherstrip of claim 1 in which said neoprene strip is enlarged at said at least one end and has a bead extending from said one end.

* * * * *